United States Patent
Chubb

(10) Patent No.: US 9,205,921 B1
(45) Date of Patent: Dec. 8, 2015

(54) METHODS AND SYSTEMS FOR CONSERVING POWER DURING HOVER FLIGHT

(71) Applicant: Google Inc., Mountain View, CA (US)

(72) Inventor: Erik Christopher Chubb, San Francisco, CA (US)

(73) Assignee: Google Inc., Mountain View, CA (US)

( * ) Notice: Subject to any disclaimer, the term of this patent is extended or adjusted under 35 U.S.C. 154(b) by 59 days.

(21) Appl. No.: 14/135,128

(22) Filed: Dec. 19, 2013

(51) Int. Cl.
| F03D 9/00 | (2006.01) |
| B64C 39/02 | (2006.01) |
| F03D 1/00 | (2006.01) |
| F03D 7/02 | (2006.01) |

(52) U.S. Cl.
CPC .............. *B64C 39/022* (2013.01); *F03D 1/006* (2013.01); *F03D 7/026* (2013.01); *F03D 9/00* (2013.01); *F05B 2240/921* (2013.01)

(58) Field of Classification Search
CPC ....... B64C 39/022; F03D 1/006; F03D 7/026; F03D 9/00; F05B 2240/921
USPC ........... 244/17.17, 153 A, 154, 155 R, 155 A; 290/44, 55; 701/3
See application file for complete search history.

(56) References Cited

U.S. PATENT DOCUMENTS

| 3,149,803 | A | * | 9/1964 | Petrides et al. ............ 244/17.13 |
| 3,241,145 | A | * | 3/1966 | Petrides ........................ 343/705 |
| 3,560,912 | A | | 2/1971 | Spink et al. |
| 3,613,626 | A | | 10/1971 | Kelly et al. |
| 4,251,040 | A | * | 2/1981 | Loyd ............................. 244/154 |
| 4,580,747 | A | | 4/1986 | Pearson |
| 5,533,694 | A | | 7/1996 | Carpenter |
| 8,134,249 | B2 | | 3/2012 | Ippolito et al. |
| 8,247,912 | B2 | | 8/2012 | Da Costa Duarte Pardal et al. |
| 8,350,403 | B2 | * | 1/2013 | Carroll ............................. 290/55 |
| 2005/0067839 | A1 | * | 3/2005 | Roberts et al. .................. 290/44 |
| 2008/0265086 | A1 | * | 10/2008 | Lee ................................. 244/30 |
| 2010/0013236 | A1 | | 1/2010 | Carroll |
| 2010/0032947 | A1 | * | 2/2010 | Bevirt ............................. 290/44 |
| 2010/0212574 | A1 | | 8/2010 | Hawkes et al. |
| 2010/0283253 | A1 | * | 11/2010 | Bevirt ............................. 290/55 |

(Continued)

OTHER PUBLICATIONS

Elliott, Shelden D., "Tethered Aerological Balloon System", Technical Progress Report 398, NOTS TP 3830, AD621959, Sep. 1965, 44 pages.*

(Continued)

*Primary Examiner* — Behrang Badii
*Assistant Examiner* — David Testardi
(74) *Attorney, Agent, or Firm* — McDonnell Boehnen Hulbert & Berghoff LLP

(57) ABSTRACT

An example method may include determining a drag force of an apparent wind on an aircraft that is coupled to a ground station via a tether. The method also includes determining a trajectory of the aircraft to a point downwind of the ground station such that the aircraft travelling the trajectory causes the tether to unfurl along a catenary path above ground. The method further includes determining an orientation of the aircraft to travel the trajectory in the apparent wind so that an actuator of the aircraft is configured to provide a vertical thrust in a direction substantially perpendicular to the ground. The method also includes determining a vertical thrust for the aircraft at the orientation to travel the trajectory in the apparent wind. The method also includes providing instructions to cause the actuator of the aircraft to provide the vertical thrust to move the aircraft along the trajectory.

20 Claims, 7 Drawing Sheets

(56) References Cited

U.S. PATENT DOCUMENTS

| | | | |
|---|---|---|---|
| 2010/0295320 A1* | 11/2010 | Bevirt et al. | 290/55 |
| 2011/0101692 A1 | 5/2011 | Bilaniuk | |
| 2011/0260462 A1* | 10/2011 | Vander Lind | 290/55 |
| 2011/0266809 A1 | 11/2011 | Calverley | |
| 2012/0104763 A1 | 5/2012 | Lind | |
| 2012/0298793 A1* | 11/2012 | Weddendorf et al. | 244/17.23 |
| 2015/0039161 A1* | 2/2015 | Hastings et al. | 701/3 |
| 2015/0076289 A1* | 3/2015 | Chubb et al. | 244/76 R |

OTHER PUBLICATIONS

Grant, Debora A. et al., "Dynamic analysis of an ascending high altitude tethered balloon", AIAA Meeting Papers on Disc, Jan. 1996, A9618538, AIAA Paper 96/0578, 11 pages.*

Lichter, Matthew D., "Performance and Feasibility Analysis of a Wind Turbine Power System for Use on Mars", NASA/TM-1999-209390, NASA/Glenn Research Center, Sep. 1999, 10 pages.*

Roberts, Bryan W., "Harnessing High-Altitude Wind Power", IEEE Transactions on Energy Conversion, vol. 22, No. 1, Mar. 2007, pp. 136 to 144.*

International Search Report mailed on Feb. 24, 2015, issued in connection with International Patent Application No. PCT/US2014/069510, filed on Dec. 10, 2014, 2 pages.

Written Opinion of the International Searching Authority mailed on Feb. 24, 2015, issued in connection with International Patent Application No. PCT/US2014/069510, filed on Dec. 10, 2014, 11 pages.

* cited by examiner

METHODS AND SYSTEMS FOR CONSERVING POWER DURING HOVER FLIGHT

BACKGROUND

Unless otherwise indicated herein, the materials described in this section are not prior art to the claims in this application and are not admitted to be prior art by inclusion in this section.

Many techniques and systems exist for controlling a flight path of an aircraft. Generally, an ability to change a position or an attitude of the aircraft will depend on the location and functionality of actuators included as part of the aircraft.

SUMMARY

In one example, a method is provided that includes determining a drag force of an apparent wind on an aircraft coupled to a ground station via a tether. The method also includes, based on the drag force and a weight of the tether, determining a trajectory of the aircraft to a point downwind of the ground station such that the aircraft travelling the trajectory causes the tether to unfurl along a catenary path above ground. The method further includes determining an orientation of the aircraft to travel the trajectory in the apparent wind so that an actuator of the aircraft is configured to provide a vertical thrust in a direction substantially perpendicular to the ground. The method also includes, based on the trajectory and a weight of the aircraft, determining a vertical thrust for the aircraft at the orientation to travel the trajectory in the apparent wind. The method also includes providing instructions to cause the actuator of the aircraft to provide the vertical thrust to move the aircraft along the trajectory.

In another example, a computer readable storage memory having stored therein instructions, that when executed by a computing device that includes one or more processors, cause the computing device to perform functions is provided. The functions comprise determining a drag force of an apparent wind on an aircraft coupled to a ground station via a tether. The functions further comprise, based on the drag force and a weight of the tether, determining a trajectory of the aircraft to a point downwind of the ground station such that the aircraft travelling the trajectory causes the tether to unfurl along a catenary path above ground. The functions further comprise determining an orientation of the aircraft to travel the trajectory in the apparent wind so that an actuator of the aircraft is configured to provide a vertical thrust in a direction substantially perpendicular to the ground. The functions further comprise based on the trajectory and a weight of the aircraft, determining a vertical thrust for the aircraft at the orientation to travel the trajectory in the apparent wind. The functions further comprise providing instructions to cause the actuator of the aircraft to provide the vertical thrust to move the aircraft along the trajectory.

In still another example, a system is provided that comprises one or more processors and memory configured to store instructions, that when executed by the one or more processors, cause the system to perform functions. The functions comprise determining a drag force of an apparent wind on an aircraft coupled to a ground station via a tether. The functions further comprise, based on the drag force and a weight of the tether, determining a trajectory of the aircraft to a point downwind of the ground station such that the aircraft travelling the trajectory causes the tether to unfurl along a catenary path above ground. The functions further comprise determining an orientation of the aircraft to travel the trajectory in the apparent wind so that an actuator of the aircraft is configured to provide a vertical thrust in a direction substantially perpendicular to the ground. The functions further comprise, based on the trajectory and a weight of the aircraft, determining a vertical thrust for the aircraft at the orientation to travel the trajectory in the apparent wind. The functions further comprise providing instructions to cause the actuator of the aircraft to provide the vertical thrust to move the aircraft along the trajectory.

In yet another example, a system is provided that includes a means for determining a drag force of an apparent wind on an aircraft coupled to a ground station via a tether. The system further comprises means for, based on the drag force and a weight of the tether, determining a trajectory of the aircraft to a point downwind of the ground station such that the aircraft travelling the trajectory causes the tether to unfurl along a catenary path above ground. The system further comprises means for determining an orientation of the aircraft to travel the trajectory in the apparent wind so that an actuator of the aircraft is configured to provide a vertical thrust in a direction substantially perpendicular to the ground. The system further comprises means for, based on the trajectory and a weight of the aircraft, determining a vertical thrust for the aircraft at the orientation to travel the trajectory in the apparent wind. The system further comprises means for providing instructions to cause the actuator of the aircraft to provide the vertical thrust to move the aircraft along the trajectory.

These as well as other aspects, advantages, and alternatives, will become apparent to those of ordinary skill in the art by reading the following detailed description, with reference where appropriate to the accompanying figures.

DETAILED DESCRIPTION

Figure 1:
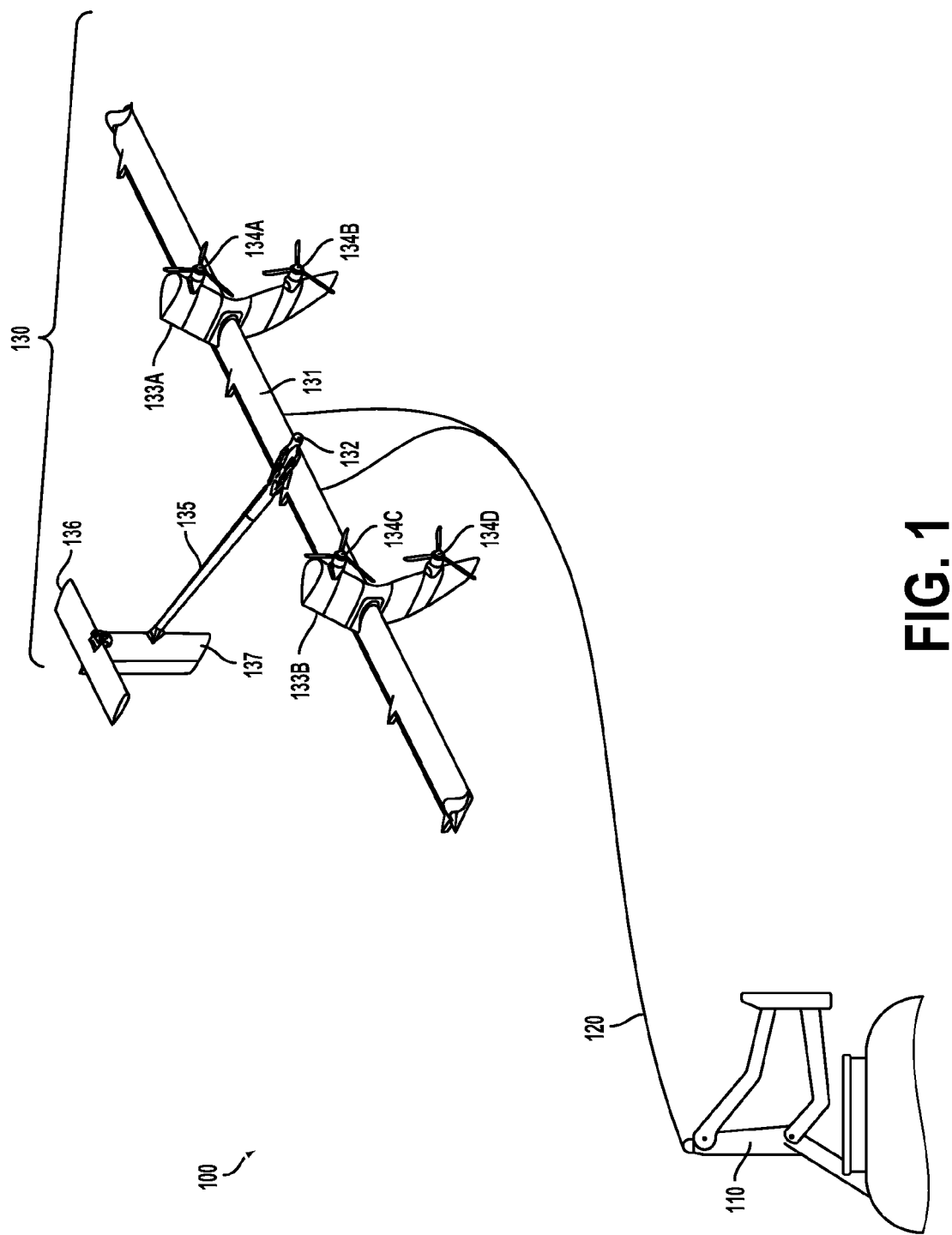
FIG. 1 depicts a tethered flight system, according to an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a processor may be configured to determine a drag force of an apparent wind on an aircraft tethered to a ground station. The processor may determine the drag force based on a density of air, a drag coefficient of the aircraft, a reference area of the aircraft, or a speed of the apparent wind. The drag coefficient may represent a tendency of the aircraft to resist movement of air moving over the surface of the aircraft based on the shape of the aircraft. The reference area of the aircraft may represent a cross sectional area of the aircraft in a plane perpendicular to the apparent wind, but may also represent any area of the aircraft.

Next, the processor may determine a trajectory of the aircraft to a point downwind of the ground station such that by moving along the trajectory, the aircraft pulls the tether along a catenary path above ground as the tether is unfurled. The processor may determine the trajectory based on the drag force and a weight of the tether, such that a tension of the tether is caused by the drag force of the apparent wind. For example, a decrease in the weight of the tether or an increase in the drag force may cause the point downwind of the ground station to be at a lower altitude. By further example, an increase in the weight of the tether or a decrease in the drag force may cause the point downwind of the ground station to be at a higher altitude.

The processor may also determine an orientation of the aircraft for the aircraft to travel toward the point downwind of the ground station. The aircraft may include an actuator and while the aircraft is in the orientation the actuator may be configured to provide a vertical thrust in a direction substantially perpendicular to the ground. The orientation may be referred to as zero pitch. The aircraft being in the orientation may allow the actuator to move the aircraft in a substantially vertical direction, while the drag force from the apparent wind moves the aircraft in a substantially horizontal direction.

Based on the trajectory and a weight of the aircraft, the processor may determine a vertical thrust for the aircraft at the orientation to travel the trajectory in the apparent wind. The processor may determine a vertical acceleration to travel the trajectory, and may determine the vertical thrust based on the vertical acceleration, the weight of the aircraft, a weight of a portion of the tether supported by the aircraft, and gravitational forces acting on the aircraft and the tether. The processor may further provide instructions to the actuator to provide the vertical thrust to move the aircraft along the trajectory.

Referring now to the figures, FIG. 1 depicts a tethered flight system 100, according to an example embodiment. The tethered flight system 100 may include a ground station 110, a tether 120, and an aircraft 130. As shown in FIG. 1, the aircraft 130 may be connected to the tether 120, and the tether 120 may be connected to the ground station 110. The tether 120 may be attached to the ground station 110 at one location on the ground station 110, and attached to the aircraft 130 at two locations on the aircraft 130. However, in other examples, the tether 120 may be attached at multiple locations to any part of the ground station 110 or the aircraft 130.

The ground station 110 may be used to hold or support the aircraft 130 until the aircraft 130 is in a flight mode. The ground station 110 may also be configured to reposition the aircraft 130 such that deploying the aircraft 130 is possible. Further, the ground station 110 may be further configured to receive the aircraft 130 during a landing. The ground station 110 may be formed of any material that can suitably keep the aircraft 130 attached or anchored to the ground while in hover flight, forward flight, or crosswind flight.

In addition, the ground station 110 may include one or more components (not shown), such as a winch, that may vary a length of the tether 120. For example, when the aircraft 130 is deployed, the one or more components may be configured to pay out or reel out the tether 120. In some implementations, the one or more components may be configured to pay out or reel out the tether 120 to a predetermined length. As examples, the predetermined length could be equal to or less than a maximum length of the tether 120. Further, when the aircraft 130 lands on the ground station 110, the one or more components may be configured to reel in the tether 120.

The tether 120 may transmit electrical energy generated by the aircraft 130 to the ground station 110. In addition, the tether 120 may transmit electricity to the aircraft 130 to power the aircraft 130 for takeoff, landing, hover flight, or forward flight. The tether 120 may be constructed in any form and using any material which allows for the transmission, delivery, or harnessing of electrical energy generated by the aircraft 130 or transmission of electricity to the aircraft 130. The tether 120 may also be configured to withstand one or more forces of the aircraft 130 when the aircraft 130 is in a flight mode. For example, the tether 120 may include a core configured to withstand one or more forces of the aircraft 130 when the aircraft 130 is in hover flight, forward flight, or crosswind flight. The core may be constructed of high strength fibers. In some examples, the tether 120 may have a fixed length or a variable length.

The aircraft 130 may include various types of devices, such as a kite, a helicopter, a wing, or an airplane, among other possibilities. The aircraft 130 may be formed of solid structures of metal, plastic, polymers, or any material which allows for a high thrust-to-weight ratio and generation of electrical energy which may be used in utility applications. Additionally, the materials may allow for a lightning hardened, redundant or fault tolerant design which may be capable of handling large or sudden shifts in wind speed and wind direction. Other materials may be possible as well.

As shown in FIG. 1, the aircraft 130 may include a main wing 131, a front section 132, actuator connectors 133A-B, actuators 134A-D, a tail boom 135, a tail wing 136, and a vertical stabilizer 137. Any of these components may be shaped in any form which allows for the use of lift to resist gravity or move the aircraft 130 forward.

The main wing 131 may provide a primary lift for the aircraft 130 during forward flight, wherein the aircraft 130 may move through air in a direction substantially parallel to a direction of thrust provided by the actuators 134A-D so that the main wing 131 provides a lift force substantially perpendicular to a ground. The main wing 131 may be one or more rigid or flexible airfoils, and may include various control surfaces or actuators, such as winglets, flaps, rudders, elevators, etc. The control surfaces may be used to steer or stabilize the aircraft 130 or reduce drag on the aircraft 130 during hover flight, forward flight, or crosswind flight. The main wing 131 may be any suitable material for the aircraft 130 to engage in hover flight, forward flight, or crosswind flight. For example, the main wing 131 may include carbon fiber or e-glass. Moreover, the main wing 131 may have a variety dimensions. For example, the main wing 131 may have one or more dimensions that correspond with a conventional wind turbine blade. The front section 132 may include one or more components, such as a nose, to reduce drag on the aircraft 130 during flight.

The actuator connectors 133A-B may connect the actuators 134A-D to the main wing 131. In some examples, the actuator connectors 133A-B may take the form of or be similar in form to one or more pylons. In the example depicted in FIG. 1, the actuator connectors 133A-B are arranged such that the actuators 134A and 134B are located on opposite sides of the main wing 131 and actuators 134C and 134D are also located on opposite sides of the main wing 131. The actuator 134C may also be located on an end of the main wing 131 opposite of the actuator 134A, and the actuator 134D may be located on an end of main wing 131 opposite of the actuator 134B.

In a power generating mode, the actuators 134A-D may be configured to drive one or more generators for the purpose of generating electrical energy. As shown in FIG. 1, the actuators 134A-D may each include one or more blades. The actuator blades may rotate via interactions with the wind and could be used to drive the one or more generators. In addition, the actuators 134A-D may also be configured to provide a thrust to the aircraft 130 during flight. As shown in FIG. 1, the actuators 134A-D may function as one or more propulsion units, such as a propeller. Although the actuators 134A-D are depicted as four actuators in FIG. 1, in other examples the aircraft 130 may include any number of actuators.

In a forward flight mode, the actuators 134A-D may be configured to generate a forward thrust substantially parallel to the tail boom 135. Based on the position of the actuators 134A-D relative to the main wing 131 depicted in FIG. 1, the actuators may be configured to provide a maximum forward thrust for the aircraft 130 when all of the actuators 134A-D are operating at full power. The actuators 134A-D may provide equal or about equal amounts of forward thrusts when the actuators 134A-D are operating at full power, and a net rotational force applied to the aircraft by the actuators 134A-D may be zero.

The tail boom 135 may connect the main wing 131 to the tail wing 136 and the vertical stabilizer 137. The tail boom 135 may have a variety of dimensions. Moreover, in some implementations, the tail boom 135 could take the form of a body or fuselage of the aircraft 130. In such implementations, the tail boom 135 may carry a payload.

The tail wing 136 or the vertical stabilizer 137 may be used to steer or stabilize the aircraft 130 or reduce drag on the aircraft 130 during hover flight, forward flight, or crosswind flight. For example, the tail wing 136 or the vertical stabilizer 137 may be used to maintain a pitch or a yaw attitude of the aircraft 130 during hover flight, forward flight, or crosswind flight. In FIG. 1, the vertical stabilizer 137 is attached to the tail boom 135, and the tail wing 136 is located on top of the vertical stabilizer 137. The tail wing 136 may have a variety of dimensions.

While the aircraft 130 has been described above, it should be understood that the methods and systems described herein could involve any aircraft that is connected to a tether, such as the tether 120.

Figure 2:
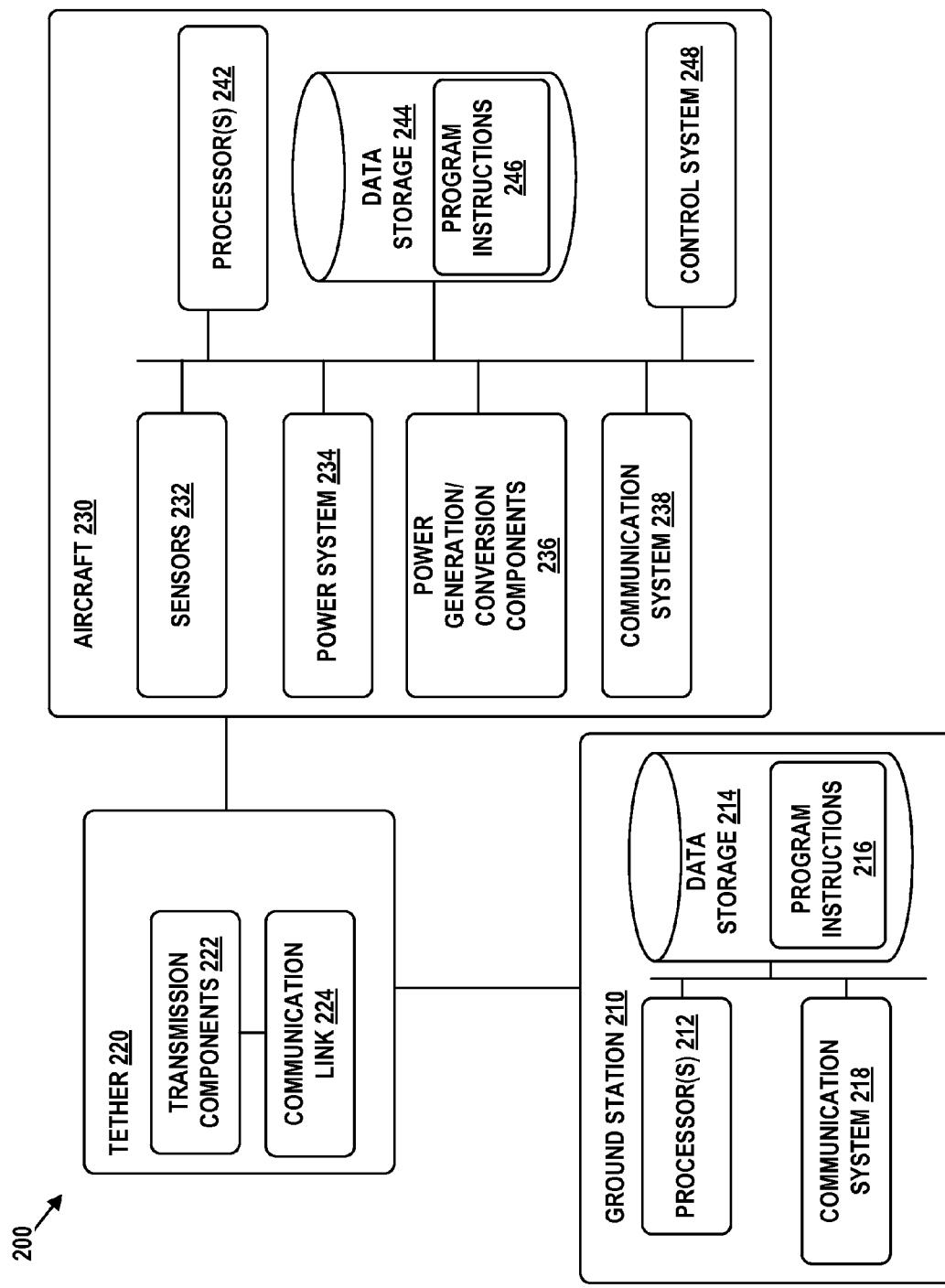
FIG. 2 is a simplified block diagram illustrating example components of the tethered flight system.

FIG. 2 is a simplified block diagram illustrating example components of the tethered flight system 200. The tethered flight system 200 may include the ground station 210, the tether 220, and the aircraft 230. As shown in FIG. 2, the ground station 210 may include one or more processors 212, data storage 214, program instructions 216, and a communication system 218. A processor 212 may be a general-purpose processor or a special purpose processor (e.g., digital signal processors, application specific integrated circuits, etc.). The one or more processors 212 may be configured to execute computer-readable program instructions 216 that are stored in data storage 214 and are executable to provide at least part of the functionality described herein.

The data storage 214 may include or take the form of one or more computer-readable storage media that may be read or accessed by at least one processor 212. The one or more computer-readable storage media can include volatile or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include the communication system 218. The communications system 218 may include one or more wireless interfaces or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), or other wireless communication protocols. Such wireline interfaces may include an Ethernet interface, a Universal Serial Bus (USB) interface, or a similar interface to communicate via a wire, a twisted pair of wires, a coaxial cable, an optical link, a fiber-optic link, or other physical connection to a wireline network. The ground station 210 may communicate with the aircraft 230, other ground stations, or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot", or as a gateway or proxy between a remote support device (e.g., the tether 220, the aircraft 230, and other ground stations) and one or more data networks, such as a cellular network or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aircraft 230 to the ground station 210 or transmit electrical energy from the ground station 210 to the aircraft 230. The transmission components 222 may take various different forms in different embodiments. For example, the transmission components 222 may include one or more conductors that are configured to transmit electricity. And in at least one such example, the one or more conductors may include aluminum or any other material which allows for the conduction of electric current. Moreover, in some implementations, the transmission components 222 may surround a core of the tether 220 (not shown).

The ground station 210 could communicate with the aircraft 230 via the communication link 224. The communication link 224 may be bidirectional and may include one or more wired or wireless interfaces. Also, there could be one or more routers, switches, or other devices or networks making up at least a part of the communication link 224.

Further, as shown in FIG. 2, the aircraft 230 may include one or more sensors 232, a power system 234, power generation/conversion components 236, a communication system 238, one or more processors 242, data storage 244, program instructions 246, and a control system 248.

The sensors 232 could include various different sensors in different embodiments. For example, the sensors 232 may include a global positioning system (GPS) receiver. The GPS receiver may be configured to provide data that is typical of GPS systems (which may be referred to as a global navigation satellite system (GNNS)), such as the GPS coordinates of the aircraft 230. Such GPS data may be utilized by the tethered flight system 200 to provide various functions described herein.

As another example, the sensors 232 may include one or more wind sensors, such as one or more pitot tubes. The one or more wind sensors may be configured to detect apparent or relative wind. Such wind data may be utilized by the tethered flight system 200 to provide various functions described herein.

Still as another example, the sensors 232 may include an inertial measurement unit (IMU). The IMU may include both an accelerometer and a gyroscope, which may be used together to determine the orientation or attitude of the aircraft 230. In particular, the accelerometer can measure the orientation of the aircraft 230 with respect to earth, while the gyroscope measures the rate of rotation around an axis, such as a centerline of the aircraft 230. IMUs are commercially available in low-cost, low-power packages. For instance, the IMU may take the form of or include a miniaturized Micro-ElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aircraft 230, errors in measurement may compound over time. However, an example aircraft 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aircraft 230 may also include a pressure sensor or barometer, which can be used to determine the altitude of the aircraft 230. Alternatively, other sensors, such as sonic altimeters or radar altimeters, can be used to provide an indication of altitude, which may help to improve the accuracy of or prevent drift of the IMU. The aircraft 230 may include a thermometer or another sensor that senses air temperature as well.

As noted, the aircraft 230 may include the power system 234. The power system 234 could take various different forms in different embodiments. For example, the power system 234 may include one or more batteries that provide power to the aircraft 230. In some implementations, the one or more batteries may be rechargeable and each battery may be recharged via a wired connection between the battery and a power supply or via a wireless charging system, such as an inductive charging system that applies an external time-varying magnetic field to an internal battery or a charging system that uses energy collected from one or more solar panels.

As another example, the power system 234 may include one or more motors or engines for providing power to the aircraft 230. In one embodiment, the power system 234 may provide power to the actuators 134A-D of the aircraft 130, as shown and described in FIG. 1. In some implementations, the one or more motors or engines may be powered by a fuel, such as a hydrocarbon-based fuel. In such implementations, the fuel could be stored on the aircraft 230 and delivered to the one or more motors or engines via one or more fluid conduits, such as piping. In some implementations, the power system 234 may be implemented in whole or in part on the ground station 210.

As noted, the aircraft 230 may include the power generation/conversion components 236. The power generation/conversion components 236 could take various different forms in different embodiments. For example, the power generation/conversion components 236 may include one or more generators, such as high-speed, direct-drive generators. The one or more generators may be driven by one or more rotors or actuators, such as the actuators 134A-D as shown and described in FIG. 1.

Moreover, the aircraft 230 may include a communication system 238. The communication system 238 may take the form of or be similar in form to the communication system 218 of the ground station 210. The aircraft 230 may communicate with the ground station 210, other aircrafts, or other entities (e.g., a command center) via the communication system 238.

In some implementations, the aircraft 230 may be configured to function as a "hot spot" or as a gateway or proxy between a remote support device (e.g., the ground station 210, the tether 220, other aircrafts) and one or more data networks, such as cellular network or the Internet. Configured as such, the aircraft 230 may facilitate data communications that the remote support device would otherwise be unable to perform by itself.

For example, the aircraft 230 may provide a WiFi connection to the remote device, and serve as a proxy or gateway to a cellular service provider's data network, which the aircraft 230 might connect to under an LTE or a 3G protocol, for instance. The aircraft 230 could also serve as a proxy or gateway to other aircrafts or a command station, which the remote device might not be able to otherwise access.

As noted, the aircraft 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aircraft 230 may include the control system 248. In some implementations, the control system 248 may be configured to perform one or more functions described herein. The control system 248 may be implemented with mechanical systems or with hardware, firmware, or software. As one example, the control system 248 may take the form of program instructions stored on a non-transitory computer readable medium and a processor that executes the instructions. The control system 248 may be implemented in whole or in part on the aircraft 230 or at least one entity remotely located from the aircraft 230, such as the ground station 210. Generally, the manner in which the control system 248 is implemented may vary, depending upon the particular embodiment.

Figure 3A:
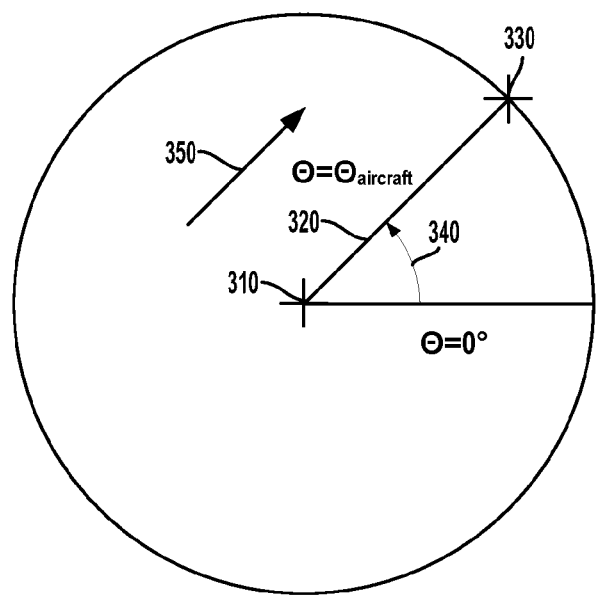
FIG. 3A depicts a downward looking view of an example tethered flight system.

FIG. 3A depicts a downward looking view of an example tethered flight system 300 which may include a ground station 310, a tether 320, and an aircraft 330. Also depicted in FIG. 3A are an azimuth angle 340 and an apparent wind 350. As shown in FIG. 3A, the ground station 310 may be coupled to the tether 320 at a first end of the tether 320 while the tether 320 may be coupled to the aircraft 330 at a second end of the tether 320. The aircraft 330 may be configured to freely fly in an azimuthal direction about the ground station 310. A position of the aircraft 330 may be characterized in part by the azimuth angle 340 between a reference angle and the azimuthal position of the aircraft 330. The ground station 310 may be rotated so as to deploy the aircraft 330 in a direction parallel to the apparent wind 350.

Figure 3B:
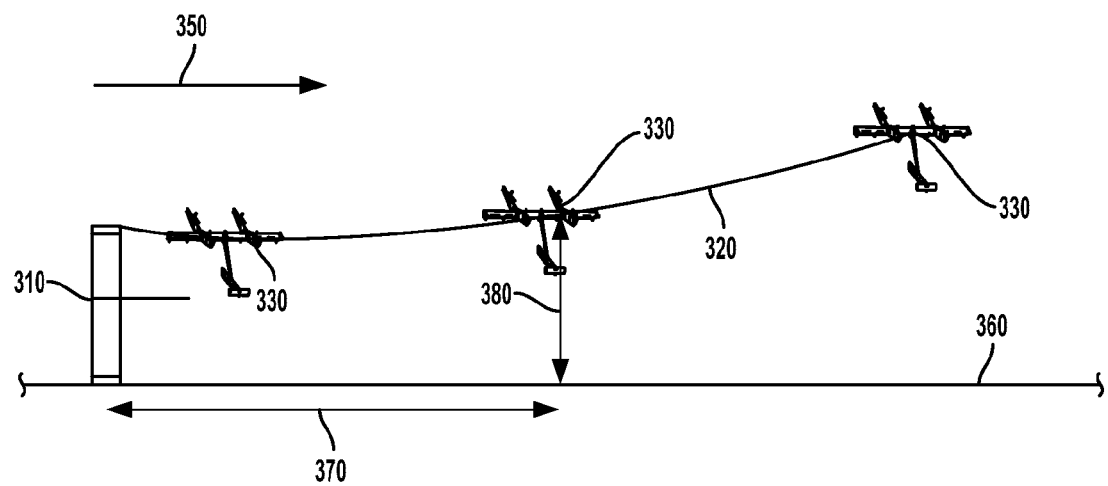
FIG. 3B depicts examples of the aircraft engaging in hover flight at various horizontal positions and altitudes.

FIG. 3B depicts examples of the aircraft 330 engaging in hover flight at various horizontal positions and altitudes. The aircraft 330 may be tethered to the ground station 310 via the tether 320. FIG. 3B also depicts the apparent wind 350, a ground 360, a horizontal distance 370, and an altitude 380 of the aircraft.

Hover flight may be characterized by the aircraft 330 travelling at an attitude such that a primary force resisting a force of gravity on the aircraft 330 is provided by the thrust of the actuators of the aircraft 330. The aircraft 330 may be deployed in a direction parallel to the apparent wind 350. In such a configuration, the actuators may be oriented to provide thrust in a direction substantially perpendicular to the ground 360 and the main wing may be oriented so that the main wing is not configured to apply a lift force to the aircraft 330 in a direction perpendicular to the ground 360. During hover flight, lift generating surfaces of the main wing, the tail wing, and the horizontal stabilizer may not be effective in generating lift as the lift generating surfaces may either be oriented to face substantially parallel to a direction of travel of the aircraft 330, or may not be impacted with a sufficient apparent wind 350 to generate a lift force. In hover flight, forces causing the aircraft 330 to move along a flight path may include forces provided by the actuators and the apparent wind 350.

Hover flight may begin with deploying the aircraft 330 from the ground station 310 in a hover-flight orientation. The ground station 310 may be rotated so as to deploy the aircraft 330 in an azimuthal direction parallel with the apparent wind 350. Deploying the aircraft 330 in the direction of the apparent wind 350 may enable the aircraft 330 to travel the horizontal distance 370 from the ground station 310 while the actuators of aircraft 330 are thrusting in a substantially vertical direction. The tether 320 may be paid out or reeled out as the aircraft 330 achieves increasing horizontal distance 370 from the ground station 310. Hover flight may include the aircraft 330 ascending, descending, or hovering over the ground 360 at an altitude 380 above the ground 360.

Figure 4A:
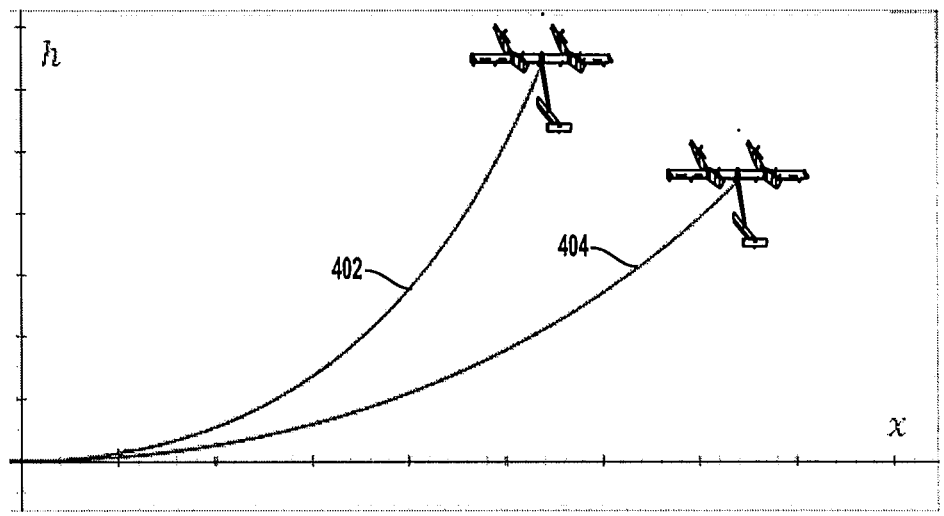
FIG. 4A depicts a first example catenary path and a second example catenary path.

FIG. 4A depicts a first example catenary path 402 and a second example catenary path 404. A cable, chain, tether or similar object may hang along a catenary path when the object is supported at a first end and second end, but otherwise allowed to freely hang and react to gravitational forces.

Within examples, a catenary path of the tether can be equivalent (or about equal) to the trajectory of the aircraft if a common point of the tether and the aircraft, i.e. a point where the tether connects to the aircraft, is defined to travel both the trajectory of the aircraft and the catenary path of the tether. To calculate the catenary path of the tether, the processor may determine the drag force (F) on the aircraft due to an apparent wind using an equation [1]:

$$F = \frac{\rho}{2} C_d A v^2 \qquad [1]$$

The determination may first include determining or receiving parameters of the equation [1] such as a density of air surrounding the aircraft ($\rho$), a drag coefficient of the aircraft ($C_d$), a reference area of the aircraft (A), and a speed of the apparent wind impacting the aircraft (v). The drag coefficient may be dependent on a number of variables, such as a shape of the aircraft and the speed of the apparent wind. The reference area of the aircraft may be a cross-sectional area of the aircraft in a plane perpendicular to a direction of the apparent wind. However, the reference area may be any area of the aircraft. The drag force on the aircraft may be proportional to the density of air, the drag coefficient, the reference area, and a square of the speed of the apparent wind, as depicted in the equation [1]. Data representing the parameters may be received by the processor from sensors of the aircraft or ground station, or may be stored in memory. For example, the processor may determine the density of air based on receiving data representing an air temperature and pressure, may receive data representing the speed of the apparent wind, but may retrieve data representing the drag coefficient and the reference area from memory. Once the drag force is determined, the drag force may be used as a parameter of an equation [2]:

$$h = \frac{T_0}{\mu}\left[\cosh\left(\frac{\mu x}{T_0}\right) - 1\right] \qquad [2]$$

The equation [2] may define a relationship between an altitude of the tether (h), the horizontal position of the tether (x), a tension of the tether ($T_0$) at a lowest point of the catenary path, and a length and a weight of the tether (or a weight per length of the tether ($\mu$)). ($T_0$ may also represent a horizontal component of the tension at any point on the tether.) A "cos h" function may be a hyperbolic cosine function, which may be equivalently expressed as exponential functions as in an equation [3]:

$$h = \frac{T_0}{\mu}\left[\left(\frac{(e^{(\mu x/T_0)} + e^{-(\mu x/T_0)})}{2}\right) - 1\right] \qquad [3]$$

The equation [3] may define a relationship between an altitude of the tether (h), the horizontal position of the tether (x), a tension of the tether ($T_0$), and a length and a weight of the tether (or a weight per length of the tether ($\mu$)).

The drag force (F) calculated using the equation [1] may be equated with the tension of the tether ($T_0$) in the equation [2] (or equation [3]). By equating the tension of the tether with the drag force, the equation [2] may represent a scenario in which any tension of the tether is due to the drag force on the aircraft and the weight of the tether. In the example, an actuator of the aircraft may be positioned to provide a thrust in a direction substantially perpendicular to the ground. By providing thrust in a substantially vertical direction, the actuator may save power for vertical propulsion that may otherwise be used to produce an additional tension on the tether. For x>0, the equation [2] generally defines a path of the tether in which the altitude (h) of the tether increases as the horizontal position (x) of the tether increases. A rate of increase of the altitude with respect to the horizontal position may increase as the horizontal position increases. It should be noted that a path of the tether will have a finite length limited by the length of the tether, whereas the equation [2] and the equation [3] define an altitude for all positive and negative values of horizontal position.

The relationship between the altitude and the horizontal position of the tether may also be expressed using the equation [3]. A constant "e" may represent Euler's number or a base of a natural logarithm (approximately 2.71828). The equation [3] may represent a function relating the horizontal position of the tether and the altitude of the tether that is equivalent to the function represented by the equation [2]. Other equations or functions that define the relationship between the horizontal position of the tether and the altitude of the tether equivalent to the equation [2] and the equation [3] may exist.

The first example catenary path 402 and the second example catenary path 404 may be catenary paths representing relationships between a horizontal position of the tether and an altitude of the tether. The first example catenary path 402 and the second example catenary path 404 may be determined based on varying parameters of the equation [1] and the equation [2] (or the equation [3]). The horizontal position of the tether may be represented on an x-axis and the altitude of the tether may be represented on an h-axis. The first example catenary path 402 or the second example catenary path 404 may be calculated by using the equation [1] to calculate a drag force of the aircraft due to an apparent wind. Next, the equation [2] or the equation [3] may be used to calculate the first example catenary path 402 or the second example catenary path 404 by using the drag force determined with the equation [1].

As depicted in FIG. 4A, the first example catenary path 402 and the second example catenary path 404 may have an altitude of zero (h=0) at a horizontal position defined as x=0. A designation of an origin for a two-dimensional space defined by horizontal position and altitude may be arbitrary. For example, x=0 may represent a horizontal position of the ground station, or x=0 may represent a horizontal position at which a minimum altitude of the first example catenary path 402 or the second example catenary path 404 occurs. If x=0 represents the horizontal position of the ground station and h=0 represents an altitude at which the tether couples to the ground station, the first example catenary path 402 and the second example catenary path 404 may both represent tether paths in which a minimum tether altitude occurs at the ground station (x=h=0). By further example, a maximum tether altitude for the first example catenary path 402 and the second example catenary path 404 may occur at an end of the tether coupled to the aircraft.

At least one parameter of the equation [2] (or the equation [3]) used to determine the first example catenary path 402 may differ from a parameter of the equation [2] (or the equation [3]) used to determine the second example catenary path 404. For example, the tension of the tether ($T_0$) represented by the first example catenary path 402 may be less than the tension of the tether ($T_0$) represented by the second example catenary path 404, while the weight per length of the tether (g) represented by the first example catenary path 402 and the second example catenary path 404 may be equal. A difference in tether tension represented by the first example catenary path 402 and the second example catenary path 404 may be caused by a difference in the density of air (ρ), the drag coefficient ($C_d$), the reference area (A), or the speed of the apparent wind (v), as depicted in the equation [1]. Alternatively, the tension of the tether ($T_0$) represented by the first example catenary path 402 may be equal to the tension of the tether ($T_0$) represented by the second example catenary path 404, while the weight per length of the tether (g) represented by the first example catenary path 402 may be greater than the weight per length of the tether (μ) represented by the second example catenary path 404. By further example, a quantity ($T_0/\mu$) corresponding to the second example catenary path 404 may be twice that of a quantity ($T_0/\mu$) corresponding to the first example catenary path 402. The variation in ($T_0/\mu$) for the first example catenary path 402 and the second example catenary path 404 may be based on varying weights per length of tethers (μ), or based on a difference in tether tensions $T_0$, which may be caused by differing drag forces (F).

An equation [4] may resemble equation [2], but may further include an h-axis parameter (a) and an x-axis parameter (b):

$$h = \frac{T_0}{\mu}\left[\cosh\left(\frac{\mu(x-b)}{T_0}\right) - \left(1 - a\frac{\mu}{T_0}\right)\right] \quad [4]$$

The h-axis parameter (a) may be determined so that a minimum altitude of a catenary path may occur at a specific altitude above (or below) a point defined as h=0. For example, if a=5, then a minimum tether altitude of a catenary path defined by the equation [4] may occur at h=5. By further example, if b=7, then a minimum tether altitude of a catenary path defined by the equation [4] may occur at x=7. An equation [5] may also include an h-axis parameter (a) and an x-axis parameter (b) that affect a catenary path similarly to the h-axis parameter (a) and the x-axis parameter (b) of the equation [4]:

$$h = \frac{T_0}{\mu}\left[\left(\frac{e^{(\mu(x-b)/T_0)} + e^{-(\mu(x-b)/T_0)}}{2}\right) - \left(1 - a\frac{\mu}{T_0}\right)\right] \quad [5]$$

Figure 4B:
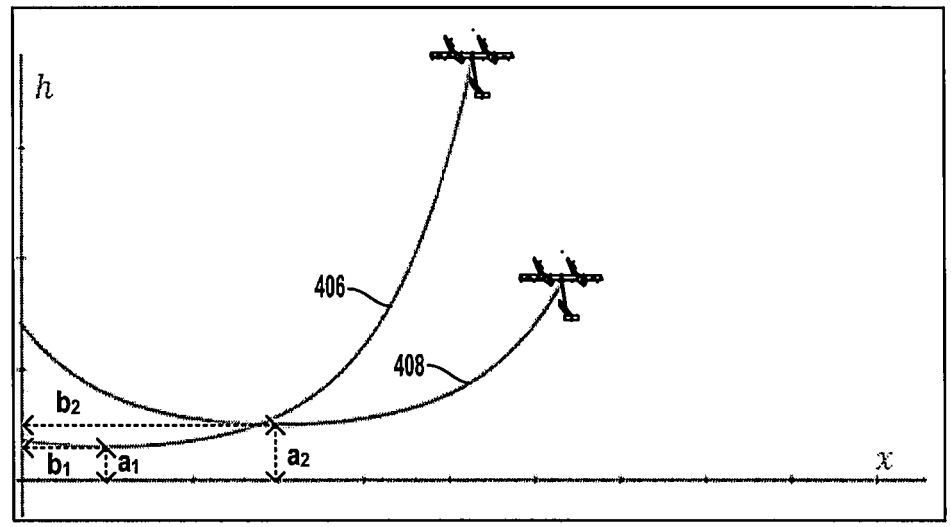
FIG. 4B depicts a third example catenary path and a fourth example catenary path.

FIG. 4B depicts a third example catenary path 406, and a fourth example catenary path 408. The third example catenary path 406 may be defined by the equation [4] with an h-axis parameter (a) of $a_1$ and an x-axis parameter (b) of $b_1$. As depicted in FIG. 4B, the third example catenary path 406 may be defined by substituting ($b_1$) for (b) and ($a_1$) for (a) in the equation [4], resulting in $$h = \frac{T_0}{\mu}\left[\cosh\left(\frac{\mu}{T_0}(x - b_1)\right) - \left(1 - a_1\frac{\mu}{T_0}\right)\right] \quad [6]$$

which may define an altitude of h=$a_1$ at a horizontal position x=$b_1$. A point (h=$a_1$, x=$b_1$) on the third example catenary path 406 may correspond to a minimum tether altitude for the third example catenary path 406. In this case, h=0 may represent the ground and h(x=0) may represent an altitude at which the tether couples to the ground station which, based on the equation [6], may be $$h(x = 0) = \frac{T_0}{\mu}\left[\cosh\left(\frac{\mu}{T_0}(-b_1)\right) - \left(1 - a_1\frac{\mu}{T_0}\right)\right]. \quad [7]$$

As depicted in FIG. 4B, the fourth example catenary path 408 may have an altitude of h=a$_2$ at a horizontal position x=b$_2$, which may be a minimum tether altitude for the fourth example catenary path 408. The fourth example catenary path 408 may be defined by the equation [4] and an h-axis parameter (a) of (a$_2$) and an x-axis parameter (b) of (b$_2$). In this case h=0 may represent the ground and h(x=0) may represent an altitude at which the tether couples to the ground station which, based on the equation [4], may be $$h(x=0) = \frac{T_0}{\mu}\left[\cosh\left(\frac{\mu}{T_0}(-b_2)\right) - \left(1 - a_2\frac{\mu}{T_0}\right)\right] \quad [8]$$

The third example catenary path 406 and the fourth example catenary path 408 may be portions of a same curve translated to accommodate differing definitions of the origin of the two-dimensional space of altitude and horizontal position. That is, the third example catenary path 406 and the fourth example catenary path 408 may be defined by an equal tension of the tether (T$_0$) and weight per length of the tether (μ), but differ only in the h-axis parameters and x-axis parameters that define the third catenary path 406 and the fourth example catenary path 408.

The catenary paths illustrated in FIG. 4 are examples only, and the catenary paths may vary based on varying parameters of Equations [1]-[8].

Causing the aircraft to travel a catenary trajectory may allow the actuator of the aircraft to provide thrust in a substantially vertical direction, allowing the drag force of the apparent wind to provide a force to move the aircraft in a horizontal direction. To maintain a hover orientation in which the actuator is configured to provide a substantially vertical thrust, a control surface of the aircraft may be used to adjust an orientation of the aircraft to the hover orientation, allowing the actuator to expend energy to produce a substantially vertical thrust.

Figure 5A:
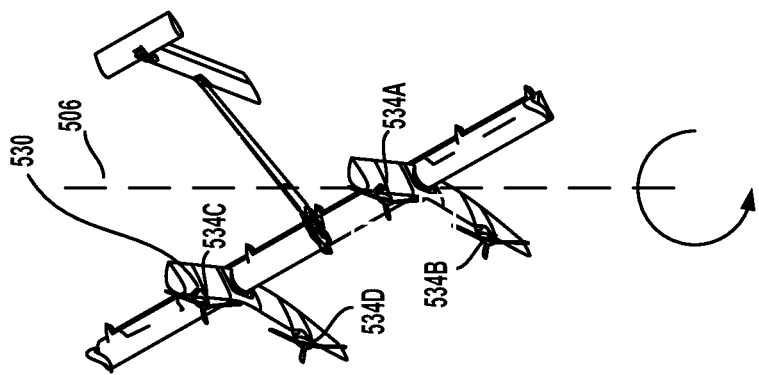
FIG. 5A depicts an example roll axis of an aircraft.

FIG. 5A depicts an example roll axis 502 of an aircraft 530. In one embodiment, the aircraft 530 may include actuators positioned to apply a torque thrust to the aircraft 530 about the roll axis 502 of the aircraft 530, causing the aircraft 530 to rotate about the roll axis 502. To land and couple the aircraft 530 onto the ground station it may be useful for the aircraft 530 to assume a particular roll angle with respect to a reference roll angle. During forward flight, roll adjustments of aircraft 530 may be made by changing a position of flaps on the main wing of the aircraft 530. It should be noted that the definition of the roll axis 502 is arbitrary and the roll axis 502 may constitute a different axis in another embodiment.

Figure 5B:
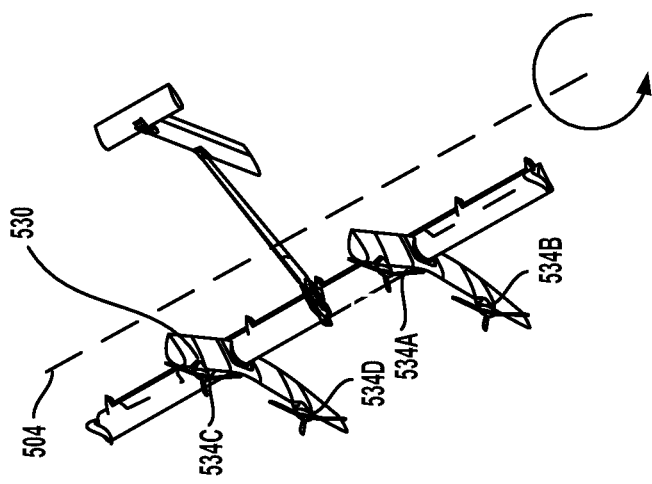
FIG. 5B depicts an example pitch axis of the aircraft.

FIG. 5B depicts an example pitch axis 504 of the aircraft 530. The aircraft 530 may include actuators 534A-D positioned to apply a torque thrust about the pitch axis 504 of the aircraft 530. To pitch the aircraft 530 in a negative direction, the actuators 534A and 534C may provide thrust while the actuators 534B and 534D are idle. Alternatively, the aircraft 530 may be pitched in a positive direction by causing the actuators 534B and 534D to provide thrust and causing the actuators 534A and 534C to be idle. Using the actuators 534A-D to provide pitch control for the aircraft 530 may be useful during hover flight, during which the tail wing of the aircraft 530 may not be configured to provide a torque about the pitch axis 504 of the aircraft 530. It should be noted that definitions of positive and negative pitch and the pitch axis 504 are arbitrary and not meant to be limiting. The pitch axis 504 may constitute a different axis in another embodiment.

Figure 5C:
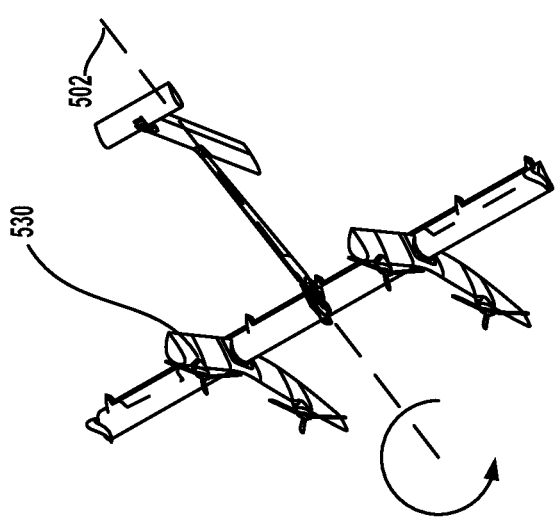
FIG. 5C depicts an example yaw axis of the aircraft.

FIG. 5C depicts an example yaw axis 506 of the aircraft 530. The aircraft 530 may include the actuators 534A-D positioned to apply a torque thrust about the yaw axis 506 of the aircraft 530. To yaw the aircraft 530 in a negative direction, the actuators 534C and 534D may provide thrust while the actuators 534A and 534B are idle. Alternatively, the aircraft 530 may be yawed in a positive direction by causing the actuators 534A and 534B to provide thrust and causing the actuators 534C and 534D to be idle. Using the actuators 534A-D to provide yaw control may be useful during hover flight during which the vertical stabilizer of the aircraft 530 may not be configured to provide a torque about the yaw axis 506 of the aircraft 530. It should be noted that definitions of positive and negative yaw and the yaw axis 506 are arbitrary and not meant to be limiting. The yaw axis 506 may constitute a different axis in another embodiment.

Figure 6A:
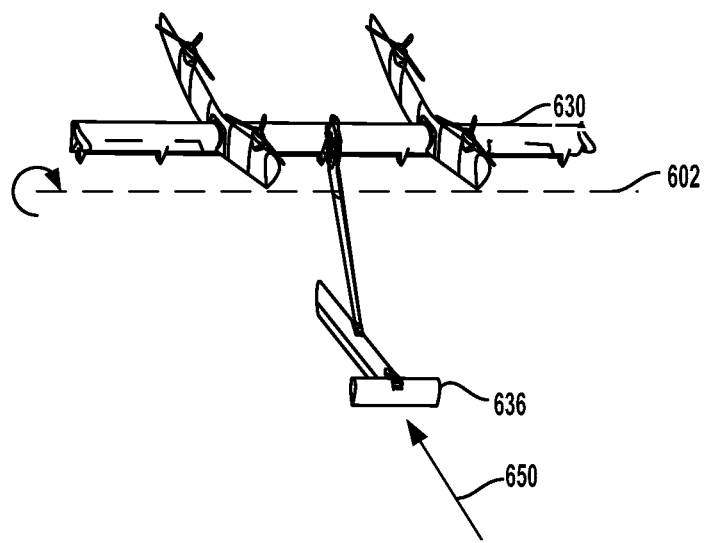
FIG. 6A depicts examples of a pitch axis of an aircraft, a tail wing, and an apparent wind.

FIG. 6A depicts examples of a pitch axis 602 of an aircraft 630, a tail wing 636, and an apparent wind 650. At times, it may be useful to change a pitch angle of the aircraft 630. To change the pitch angle of the aircraft 630 and conserve power otherwise consumed by an actuator of the aircraft 630, the tail wing 636 may be configured to orient a surface of the tail wing 636 to face the apparent wind 650 so that the apparent wind 650 applies a drag force to the tail wing 636. The drag force may result in a torque moment that causes the aircraft 630 to rotate with respect to the pitch axis 602 in a direction indicated in FIG. 6A.

Figure 6B:
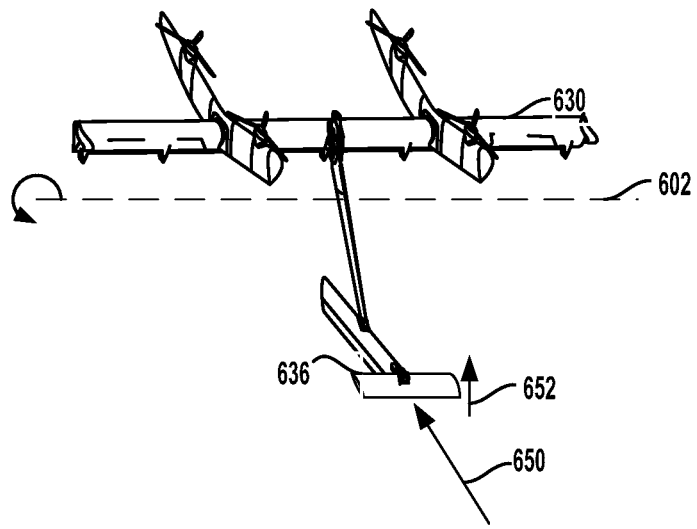
FIG. 6B depicts examples of a pitch axis of an aircraft, a tail wing, and an apparent wind.

FIG. 6B depicts examples of a pitch axis 602 of an aircraft 630, a tail wing 636, and an apparent wind 650. At times, it may be useful to change a pitch angle of the aircraft 630. To change the pitch angle of the aircraft 630 and conserve power otherwise consumed by an actuator of the aircraft 630, the tail wing 636 may be configured to orient a surface of the tail wing 636 to face substantially perpendicular to the apparent wind 650 so that the apparent wind 650 applies a lift force 652 to the tail wing 636. The lift force 652 may result in a torque moment that causes the aircraft 630 to rotate with respect to the pitch axis 602 in a direction indicated in FIG. 6B.

Figure 7:
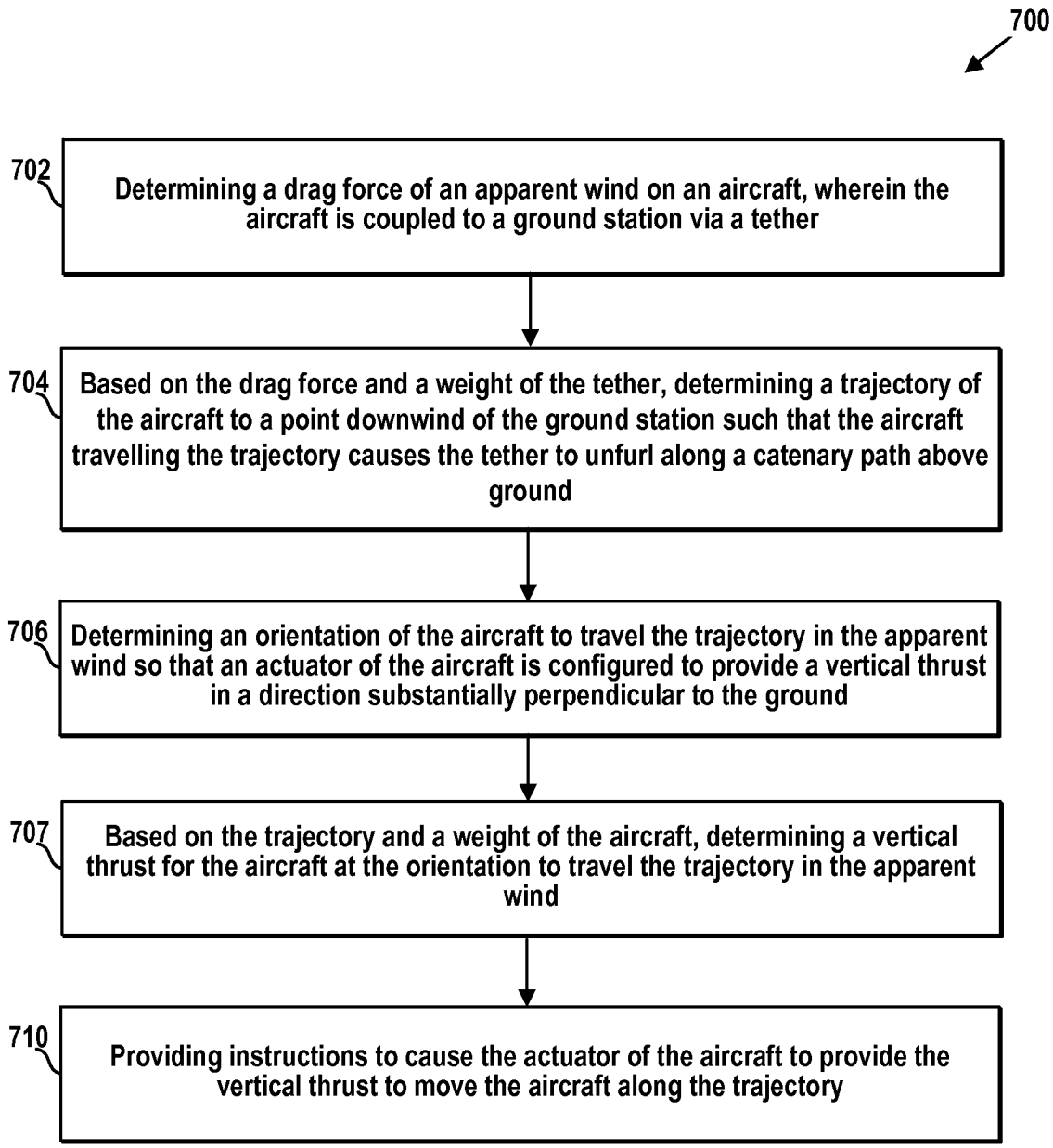
FIG. 7 is a block diagram of an example method for determining a trajectory and an orientation of the aircraft that causes a tether to unfurl along a catenary path above ground.

FIG. 7 is a block diagram of an example method 700 for determining a trajectory and an orientation of the aircraft that causes a tether to unfurl along a catenary path above ground, in accordance with at least some embodiments described herein. Method 700 shown in FIG. 7 presents an embodiment of a method that, for example, could be used with a computing device. Functions of the method 700 may be fully performed by a processor of a computing device, by a computing device, or may be distributed across multiple processors or multiple computing devices and/or a server. In some examples, the computing device may receive information from sensors of the computing device, or where the computing device is a server the information can be received from another device that collects the information.

Method 700 may include one or more operations, functions, or actions as illustrated by one or more blocks of 702-710. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, or compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 700 and other processes and methods disclosed herein, each block in FIG. 7 may represent circuitry that is wired to perform the specific logical functions in the process.

At block 702, the method 700 includes determining a drag force of an apparent wind on an aircraft coupled to a ground station via a tether. A processor may determine the drag force using a drag force equation, such as equation [1]. More specifically, the processor may calculate the drag force based on a proportionality between the drag force and a density of air, between the drag force and a reference area of the aircraft, between the drag force and a drag coefficient, or between the drag force and a square of the speed of the apparent wind. The drag coefficient may indicate a resistance of the aircraft to air moving against a surface of the aircraft and may be dependent on a shape of the aircraft or the speed of the apparent wind.

At block 704, the method 700 includes, based on the drag force and a weight of the tether, determining a trajectory of the aircraft to a point downwind of the ground station such that the aircraft travelling the trajectory causes the tether to unfurl along a catenary path above ground. The catenary path may represent a shape of the tether caused by gravity acting on the tether while the tether is supported at a first end by the ground station and supported at a second end by the aircraft. The processor may determine the trajectory by determining an azimuth angle for the trajectory that is parallel to a direction of the apparent wind. The processor may further determine a series of altitudes that correspond to a series of horizontal positions of the tether along the azimuth angle.

The processor may determine the trajectory based on the drag force equation and a catenary equation, such as equations [1]-[8] such that the aircraft travelling the trajectory in the apparent wind causes a tension of the tether to have a horizontal component substantially equal to the drag force of the apparent wind. In this way, the trajectory may be optimized so that the tether is maintained above a minimum altitude, the apparent wind pushes the aircraft in a horizontal direction, and the actuator of the aircraft provides a vertical thrust substantially perpendicular to the ground. The trajectory determined by the processor may also cause a tension of the tether to have a vertical component equal to a weight of a portion of the tether. That is, the aircraft travelling the trajectory may restrain the tether from touching the ground or from dropping below a certain altitude, but may not require thrust to be provided by an actuator to place additional tension on the tether.

The aircraft travelling the trajectory may also cause a first portion of the tether to occupy a position on the catenary path previously occupied by a second portion of the tether. As the aircraft travels the trajectory and increases a distance of the aircraft from the ground station, the tether may be reeled out by the ground station to accommodate the increased distance of the aircraft from the ground station. An overall shape of the tether suspended by the ground station and the aircraft may remain unchanged as the tether is reeled out, except that an additional section of the catenary path adjacent to the aircraft may be added to a previous path of the tether. In this way, once a position on the catenary path has been occupied by a portion of the tether, the position may continue to be occupied by other portions of the tether as the tether is reeled out.

The method 700 may also include the processor receiving data representing a horizontal position of the ground station, an altitude of the ground station, and a length of the tether. The processor may then determine the catenary path based on the length of the tether and a tension of the tether so that the aircraft travelling the catenary path causes a tension of the tether to be about equal to the drag force of the apparent wind on the aircraft. The tension may occur at the minimum altitude of the catenary path. By minimizing the tension of the tether caused by the actuator of the aircraft, an energy dissipated by the actuator may be minimized. The processor may then determine parameters of the catenary path that cause the catenary path to include a point defined by the horizontal position of the ground station and the altitude of the ground station. The processor may also determine the parameters so that a minimum altitude of the catenary path occurs within a range of horizontal position bounded by the horizontal position of the ground station and the point downwind of the ground station. The processor may receive data representing a minimum tether altitude and determine the parameters so that a minimum altitude of the catenary path is about equal to the minimum tether altitude.

The catenary path may be determined by the processor based on the equation [4] (or equation [5]). ($T_0$) may represent a tension of the tether at a lowest point of the catenary path, or a horizontal component of the tension at any point on the tether. To reduce the energy consumed by the actuator, the tension $T_0$ may be about equal to the drag force of the apparent wind defined by the equation [1]. ($\rho$) may represent a density of air, ($C_d$) may represent the drag coefficient of the aircraft, (A) may represent the reference area of the aircraft, and (v) may represent the speed of the apparent wind. In the catenary equation, ($\rho$) may represent the weight per length of the tether, (a) may represent a vertical adjustment parameter, (b) may represent a horizontal adjustment parameter, (h) may represent altitude, and (x) may represent horizontal position.

For example, the horizontal position of the ground station and the altitude of the ground station may be x=0 and h=5, respectively. For purposes of illustration, a quantity ($T_0/\rho$) may be equal to 1. In this case, the catenary equation may take a simplified form, h=cos h(x−b)−(1−a). The processor may then determine the parameters (a) and (b) such that the altitude of the tether at a horizontal position represented by x=0 is h=5. The processor may first determine (a) such that a minimum altitude of the catenary path corresponds to the minimum tether altitude. For example, to yield a catenary path in which the minimum altitude of the path is h=1, the processor may determine (a) to be equal to 1, based on a minimum value of cos h(x−b) being equal to 1. The catenary equation may then be expressed as h=cos h(x−b). Next, the processor may determine (b) such that an altitude of the catenary path at x=0 is h=5, by solving an equation 5=cos h(0−b). There may exist two such values of (b) that solve the equation, b≈2.29243 and b≈−2.29243. The processor may determine that determining (b) to be equal to 2.29243 will cause the minimum altitude of the catenary path to occur at a position between the ground station and the point downwind of the ground station (i.e. the minimum altitude may occur on a positive-x side of the x-axis). In this example, (b) may be determined to be 2.29243 by the processor. By further example, referring to FIG. 4, the third example catenary path 406 may depict a catenary path corresponding to parameters b=1 and a=2, while the fourth example catenary path 408 may depict a catenary path corresponding to parameters b=3 and a=4. (Note that in this example, the x-axis and the h-axis may not share a common scale.) Accordingly, the altitude of the third example catenary path 406 at x=0 may be h≈2.543 and the altitude of the fourth example catenary path 408 at x=0 may be h≈13.068.

The processor may also determine a horizontal position and an altitude corresponding to an endpoint of the trajectory based on the length of the tether, the weight of the tether, and the drag force. Once the catenary path is determined, an arc length (s) of the catenary path from a horizontal position $x_1$ to a horizontal position $x_2$ can be determined using an equation [9]:

$$s = \int_{x_1}^{x_2} \sqrt{1+\left(\frac{dh}{dx}\right)^2} \, dx \quad [9]$$

where (h) is the altitude of the catenary path defined by the equation [4]. If a total length of the tether is known, (s) in the equation [9] can be set equal to the total tether length, and a horizontal distance between the ground station at $x_1$ and the point downwind of the ground station at $x_2$ can be determined. For purposes of illustration, the ground station may have a horizontal position x=0=$x_1$, the tether may have a length of 50 and (a) may equal 2 and (b) may equal 1, yielding equation [10]:

$$h(x) = \cos h(x-1)-(1-2) \quad [10]$$

In this case, the endpoint of the trajectory would be determined using an equation $$50 = \int_0^{x_2} \sqrt{1+\sin h^2(x-1)} \, dx \quad [11]$$

A solution to the equation [11] may be $x_2 \approx 5.582$. An altitude (h) of the endpoint of the catenary path may be determined by the processor using the equation [4] and the horizontal position of the endpoint. In the case of $x_2$=5.582, h may be approximately 49.86.

At block 706, the method 700 includes determining an orientation of the aircraft to travel the trajectory in the apparent wind so that an actuator of the aircraft is configured to provide a vertical thrust in a direction substantially perpendicular to the ground. The processor may first receive data representing a direction in which the actuator is configured to provide thrust relative to an axis of the aircraft. Next, the processor may determine an angle of rotation of the aircraft relative to the axis of the aircraft such that at the angle of rotation, the actuator is configured to provide the vertical thrust in a direction substantially perpendicular to the ground. In other words, the processor may determine an orientation of the aircraft based on a relative orientation of the actuator with respect to the aircraft, such that the actuator is configured to provide a substantially downward thrust perpendicular to the ground. Limiting the thrust of the actuator to be in the vertical direction may allow the aircraft to rely on the force of the apparent wind to travel in the horizontal direction.

At block 708, the method 700 includes determining a vertical thrust for the aircraft at the orientation to travel the trajectory in the apparent wind based on the trajectory and a weight of the aircraft. The processor may also receive data representing a weight, a position, and a vertical velocity of the aircraft, and a weight of a portion of the tether supported by the aircraft. With the data, the processor may determine a gravitational force acting on the aircraft based on the weight of the aircraft and the weight of the portion of the tether supported by the aircraft. The processor may determine the weight of the portion of the tether supported by the aircraft based on a weight per length of the tether and a length of the portion of the tether. The processor may next determine a vertical acceleration of the aircraft based on the position and the vertical velocity of the aircraft, wherein the aircraft achieving the vertical acceleration and the drag force pushing the aircraft horizontally cause the aircraft to follow the trajectory. Finally, the processor may determine the vertical thrust based on a force to counteract the downward force and achieve the vertical acceleration.

At block 710, the method 700 includes providing instructions to cause the actuator of the aircraft to provide the vertical thrust to move the aircraft along the trajectory. The processor may provide the instructions to the actuator or a control system of the aircraft that controls the actuator.

The processor may further receive data indicating an initial orientation of the aircraft, and a speed and a direction of the apparent wind. The processor may use the data to determine a position of the tail wing relative to the direction of the apparent wind configured to cause the apparent wind to produce a rotational force about a pitch axis of the aircraft. The rotational force may be configured to rotate the aircraft from the initial orientation to a hover orientation. As shown and described in FIGS. 6A and 6B, the tail wing 636 of the aircraft may be configured to provide pitch control while the aircraft is in a hover orientation. The tail wing 636 may provide pitch control in a first direction by orienting the tail wing so that the apparent wind produces a drag force against the tail wing. The drag force may create a pitch moment in a first direction about the pitch axis of the aircraft, as shown in FIG. 6A. The tail wing may provide pitch control in a second direction by orienting the tail wing so that the apparent wind produces a lift force against the tail wing. The lift force may create a pitch moment in a second direction about the pitch axis of the aircraft, as shown in FIG. 6B. Lastly, the processor may provide instructions to the control system of the aircraft (or the ground station) to move the tail wing to provide the rotational force to rotate the aircraft to the hover orientation.

The tail wing may be configured to produce the lift force based on the apparent wind achieving a threshold speed, such as 15 meters per second. The processor may provide the instructions to move the tail wing to provide the rotational force based on receiving a notification from a sensor of the aircraft that the speed of the apparent wind is greater than or equal to the threshold speed. Unless the apparent wind has a speed greater than the threshold speed, the tail wing may not be configured to provide a lift force configured for pitch control of the aircraft while the aircraft is in the hover orientation. Deploying the aircraft along the catenary path and using the tail wing for pitch control may increase a margin between a nominal actuator output and a maximum actuator output, thereby increasing an ability of the aircraft to respond to disturbances (e.g. wind gusts) that cause deviations from the catenary path or a particular attitude of the aircraft.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   sensing a speed of an apparent wind on an aircraft, wherein the aircraft is coupled to a ground station via a tether;
   based on (i) the sensed speed of the apparent wind and (ii) a weight of the tether, determining, by one or more processors, a trajectory of the aircraft to a point downwind of the ground station such that the aircraft travelling the trajectory pulls the tether along a catenary path;
   based on the trajectory and a weight of the aircraft, determining a vertical thrust for the aircraft to travel the trajectory in the apparent wind; and
   providing instructions to cause an actuator of the aircraft to provide the vertical thrust to move the aircraft along the trajectory.

2. The method of claim 1, further comprising:
   determining a drag force of the apparent wind on the aircraft based on a density of air, a reference area of the aircraft, or the sensed speed of the apparent wind; and
   determining the trajectory based on the drag force.

3. The method of claim 1, further comprising:
   determining a drag force of the apparent wind on the aircraft based on a drag coefficient, wherein the drag coefficient indicates a resistance of a surface of the aircraft to air moving against the surface; and
   determining the trajectory based on the drag force.

4. The method of claim 1, wherein the aircraft travelling the trajectory comprises a point common to both the tether and the aircraft travelling the trajectory.

5. The method of claim 1, wherein determining the trajectory of the aircraft comprises:
   determining an azimuth angle for the trajectory; and
   determining an altitude corresponding to a horizontal position on the ground along a line defined by the azimuth angle.

6. The method of claim 1, wherein determining the trajectory of the aircraft comprises:
   determining the trajectory such that the aircraft traveling the trajectory causes a tension of the tether to have a horizontal component substantially equal to a drag force of the apparent wind on the aircraft.

7. The method of claim 1, wherein determining the trajectory of the aircraft comprises:
   determining the trajectory such that the aircraft traveling the trajectory causes a tension of the tether to have a vertical component substantially equal to a weight of the tether.

8. The method of claim 1, wherein determining the trajectory of the aircraft comprises:
   determining the trajectory such that the aircraft traveling the trajectory causes a first portion of the tether to occupy a position on the catenary path previously occupied by a second portion of the tether.

9. The method of claim 1, wherein determining the trajectory of the aircraft comprises:
   determining the catenary path based on a length of the tether and a tension of the tether, wherein the tension of the tether is about equal to a drag force of the apparent wind on the aircraft; and
   determining a parameter of the catenary path so that:
     the catenary path includes a point defined by the horizontal position of the ground station and the altitude of the ground station, and
     a minimum altitude of the catenary path occurs within a range of horizontal position bounded by the horizontal position of the ground station and the point downwind of the ground station.

10. The method of claim 9, wherein determining the trajectory of the aircraft further comprises:
    determining the parameter of the catenary path so that the minimum altitude of the catenary path is about equal to a predetermined altitude.

11. The method of claim 1, wherein determining the trajectory of the aircraft comprises:
    determining a horizontal position corresponding to an endpoint of the trajectory based on a length of the tether, the weight of the tether, and a drag force of the apparent wind on the aircraft.

12. The method of claim 1, wherein determining the trajectory of the aircraft comprises:
    determining an altitude corresponding to an endpoint of the trajectory based on a length of the tether, the weight of the tether, and a drag force of the apparent wind on the aircraft.

13. The method of claim 1, further comprising:
    determining an orientation of the aircraft to travel the trajectory in the apparent wind so that the actuator of the aircraft is configured to provide the vertical thrust in a direction substantially perpendicular to the ground.

14. The method of claim 1, wherein determining the vertical thrust for the aircraft comprises:
    determining the vertical thrust based on a position and a vertical velocity of the aircraft, wherein the actuator providing the vertical thrust and a drag force of the apparent wind on the aircraft pushing the aircraft horizontally cause the aircraft to follow the trajectory.

15. The method of claim 1, wherein the aircraft includes a tail wing and is engaged in hover flight, and the method further comprises:
    receiving data indicating an initial orientation of the aircraft, and a speed and a direction of the apparent wind;
    determining a position of the tail wing relative to the direction of the apparent wind configured to cause the apparent wind to produce a rotational force about a pitch axis of the aircraft to rotate the aircraft from the initial orientation to a hover orientation; and
    providing instructions to move the tail wing to provide the rotational force to rotate the aircraft to the hover orientation.

16. The method of claim 15, wherein providing instructions to move the tail wing to provide the rotational force to rotate the aircraft to the hover orientation comprises:
    providing the instructions based on receiving a notification that a speed of the apparent wind is sufficient to produce the rotational force.

17. A non-transitory computer readable storage memory having stored therein instructions, that when executed by a computing device that includes one or more processors, causes the computing device to perform functions comprising:
- sensing a speed of an apparent wind on an aircraft, wherein the aircraft is coupled to a ground station via a tether;
- based on (i) the sensed speed of the apparent wind and (ii) a weight of the tether, determining a trajectory of the aircraft to a point downwind of the ground station such that the aircraft travelling the trajectory pulls the tether along a catenary path;
- based on the trajectory and a weight of the aircraft, determining a vertical thrust for the aircraft to travel the trajectory in the apparent wind; and
- providing instructions to cause an actuator of the aircraft to provide the vertical thrust to move the aircraft along the trajectory.

18. The non-transitory computer readable storage memory of claim 17, wherein the aircraft travelling the trajectory comprises a point common to both the tether and the aircraft travelling the trajectory.

19. A computing device comprising:
one or more processors; and
memory configured to store instructions, that when executed by the one or more processors, cause the computing device to perform functions comprising:
- sensing a speed of an apparent wind on an aircraft, wherein the aircraft is coupled to a ground station via a tether;
- based on (i) the sensed speed of the apparent wind and (ii) a weight of the tether, determining a trajectory of the aircraft to a point downwind of the ground station such that the aircraft travelling the trajectory pulls the tether along a catenary path;
- based on the trajectory and a weight of the aircraft, determining a vertical thrust for the aircraft to travel the trajectory in the apparent wind; and
- providing instructions to cause an actuator of the aircraft to provide the vertical thrust to move the aircraft along the trajectory.

20. The computing device of claim 19, wherein the aircraft travelling the trajectory comprises a point common to both the tether and the aircraft travelling the trajectory.

* * * * *